(12) United States Patent
Singh

(10) Patent No.: US 7,990,893 B1
(45) Date of Patent: Aug. 2, 2011

(54) FAST PREFIX-BASED NETWORK ROUTE FILTERING

(75) Inventor: Mitali Singh, Menlo Park, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 158 days.

(21) Appl. No.: 12/484,874

(22) Filed: Jun. 15, 2009

Related U.S. Application Data

(60) Provisional application No. 61/179,585, filed on May 19, 2009.

(51) Int. Cl.
*H04L 12/28* (2006.01)
(52) U.S. Cl. ........ 370/254; 370/392; 370/400; 709/224; 709/242
(58) Field of Classification Search .......................... None
See application file for complete search history.

(56) References Cited

U.S. PATENT DOCUMENTS

| | | | | |
|---|---|---|---|---|
| 7,474,657 | B2 * | 1/2009 | Sahni et al. ................... | 370/392 |
| 7,787,396 | B1 * | 8/2010 | Nalawade et al. ............ | 370/254 |
| 2006/0198322 | A1 * | 9/2006 | Hares ............................ | 370/254 |
| 2006/0245374 | A1 * | 11/2006 | Patel et al. .................... | 370/254 |

OTHER PUBLICATIONS

Chen et al., "Outbound Route Filtering Capability for BGP-4," Network Working Group IETF, Jan. 2009, 13 pp.
Chen et al., "Address Prefix Based Outbound Route Filter for BGP-4," Network Working Group IETF, Jan. 2009, 7 pp.
Chen at al., "Address Prefix Based Outbound Route Filter for BGP-4," Network Working Group IETF, Jan. 2007, 6 pp.
Chen et al., "Address Prefix Based Outbound Route Filter for BGP-4," Network Working Group IETF, Nov. 2006, 6 pp.
Chen et al., "Address Prefix Based Outbound Route Filter for BGP-4," Network Working Group IETF, May 2006, 7 pp.
Chen et al., "Address Prefix Based Outbound Route Filter for BGP-4," Network Working Group IETF, Oct. 2005, 6 pp.
Chen et al., "Address Prefix Based Outbound Route Filter for BGP-4," Network Working Group IETF, Feb. 2005, 6 pp.
Chen et al., "Address Prefix Based Outbound Route Filter for BGP-4," Network Working Group RFC 5292, Aug. 2008, 7 pp.

* cited by examiner

*Primary Examiner* — Chirag G Shah
*Assistant Examiner* — Minh-Trang Nguyen
(74) *Attorney, Agent, or Firm* — Shumaker & Sieffert, P.A.

(57) ABSTRACT

In general, the invention is directed to techniques for improving the performance of route filtering methods. More specifically, an interval tree data structure is assembled from one or more address prefix outbound route filter (ORF) entries by partitioning, according to the characteristics of the ORF entries, a two-dimensional space defined by the address prefix and prefix length domains into non-overlapping intervals. Each node in the interval tree represents a non-overlapping interval in the address prefix dimension. In addition, each node includes a distinct tree structure having nodes that maintain information about the ORF entries that map onto the represented interval for various non-overlapping intervals in the prefix length domain. By traversing the two tiers of trees, a network device can quickly determine the appropriate action to apply to a route.

18 Claims, 10 Drawing Sheets

| SEQ NO | PREFIX | LEN | MIN LEN | MAX LEN | MATCH |
|---|---|---|---|---|---|
| 2 | 2.3.0.0 | 16 | 0 | 0 | Permit |
| 1 | 2.2.2.0 | 24 | 25 | 30 | Deny |
| 4 | 2.2.0.0 | 16 | 28 | 32 | Permit |
| 5 | 0.0.0.0 | 0 | 0 | 32 | Deny |

| SEQ NO | PREFIX | LEN | MIN LEN | MAX LEN | MATCH |
|---|---|---|---|---|---|
| 2 | 2.3.0.0 | 16 | 0 | 0 | Permit |
| 1 | 2.2.2.0 | 24 | 25 | 30 | Deny |
| 4 | 2.2.0.0 | 16 | 28 | 32 | Permit |
| 5 | 0.0.0.0 | 0 | 0 | 32 | Deny |
| 3 | 2.2.0.16 | 28 | 29 | 32 | Deny |

FIG. 9

FAST PREFIX-BASED NETWORK ROUTE FILTERING

This application claims the benefit of U.S. Provisional Application No. 61/179,585, filed May 19, 2009, which is hereby incorporated by reference in its entirety.

TECHNICAL FIELD

The invention relates to computer networks and, more particularly, to filtering route information within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain routing information that describes routes through the network. A "route" can generally be defined as a path between two locations on the network. Conventional routers often maintain the routing information in the form of one or more routing tables or other data structures. The form and content of the routing tables often depend on the particular routing algorithm implemented by the router.

Upon receiving incoming packets, the routers examine information within the packets, and forward the packets in accordance with the routing information. In order to maintain an accurate representation of the network, routers periodically exchange routing information in accordance with routing protocols, such as the Border Gateway Protocol (BGP).

When two network devices that are BGP peers (or neighbors) initially connect, the BGP peers typically exchange routing information specifying one or more routes. From then on, the BGP peers send control messages to incrementally update the routing information when the network topology changes. For example, the BGP peers may send update messages to advertise newly available routes and withdraw routes that are no longer available.

A BGP router frequently receives unwanted routes from its peers that the BGP router then drops in accordance with a local routing policy. For example, in some cases peers of a BGP router may send route advertisements to the BGP router announcing routes that the BGP router would not utilize according to its local routing policy. In order to save network resources involved in generating, sending, receiving, and processing routing messages containing unwanted routing information updates, a BGP router may send an outbound route filter (ORF), in the form of one or more ORF entries, to each of its BGP peers, which the BGP peers then use to filter outbound routes for that router. Each ORF includes ORF entries that specify the action for the BGP peers to take upon a route match, typically "deny" or "permit," and the ORF entries are stored by BGP routers in a separate list for each BGP peer. When determining whether to filter outbound routes for a BGP peer, a BGP router consults the corresponding ORF for that BGP peer. The BGP router compares outbound routes to the ORF entries of the corresponding ORF to determine the appropriate ORF entry to apply to the outbound routes being advertised. A BGP-based mechanism that allows a BGP router to send to its BGP peer an ORF, in the form of one or more ORF entries, that the peer would use to constrain/filter its outbound route updates to the router is defined in Chen, E., and Rekhter, Y., "Outbound Route Filtering Capability for BGP-4", draft-ietf-idr-route-filter-15.txt, July 2006, hereby incorporated by reference.

Further, one ORF-type for BGP, termed "Address Prefix Outbound Route Filter (Address Prefix ORF)", that can be used to perform address prefix based route filtering is defined in "Address Prefix Based Outbound Route Filter for BGP-4", by Chen, E., and Sangli, S., draft-ietf-idr-bgp-prefix-orf-04.txt, January 2007, hereby incorporated by reference. An address prefix-based ORF consists of an sequence of address-prefix ORF entries, each of which defines the range of route prefixes and route prefix lengths to which the filter applies, as well as the action to be taken on finding a match.

Use of such address prefix-based route filters has become common by network providers to implement local policy-based route filtering for inbound or outbound routes. In order to determine whether to accept or reject a route, a router determines the action for the prefix-based route filter with the smallest sequence number in the list matching the route prefix. Inefficient implementations of route filter list require traversal of the entire list for determining the match, which can degrade routing performance significantly.

SUMMARY

In general, the invention is directed to an efficient data structure for maintaining and using an address prefix-based ORF employed in route filtering by routers that exchange routing information in accordance with a routing protocol. More specifically, a novel data structure for maintaining these ORFs is described, which allows faster filtering by pre-computing the action to be taken for routes falling in prefix ranges for which filters have been specified. For example, an interval tree data structure is assembled from one or more address prefix ORF entries of the ORF by partitioning, according to the characteristics of the ORF entries, a two-dimensional space defined by (1) an address prefix dimension and (2) a prefix length dimension into non-overlapping intervals. By traversing the interval tree data structure, a router can quickly determine the appropriate action to apply to an outbound route being advertised.

In address prefix-based outbound route filtering, ORF entries may be expressed in terms of address prefixes and a range of prefix lengths. Each ORF entry for an address prefix-based filter defines an address prefix and a range of prefix lengths (specified by minimum and maximum prefix length fields) to which the filter applies. The ranges of addresses encompassed by a route prefix and/or the range of prefix lengths for two or more prefix-based route filters frequently overlap. By convention, the ORF entries are prioritized by sequence number. If a particular route were to match more than one ORF entry, the correct filter to be applied is the matching ORF entry with the lowest sequence number.

The invention specifies a novel data structure maintained by a network device, in the form of a height-balanced interval tree, that is assembled from one or more address prefix ORF entries by partitioning a two-dimensional space, defined by (i) an address prefix dimension and (ii) a prefix length dimension, according to the characteristics of the ORF entries. This partitioning is achieved by determining the two-dimensional interval encompassed, for each address prefix ORF entry, by the range of addresses defined by the address prefix within an address prefix dimension as well as the range of prefix lengths specified by the values of the minimum and maximum prefix lengths for the entry within a prefix length dimension.

Intervals defined by partitions along the address prefix dimension for the two-dimensional interval are stored as prefix nodes. Each node in the interval tree represents a non-overlapping interval in the address prefix dimension. Accordingly, each prefix node specifies the range of network addresses encompassed by an address prefix interval. In addition, each node includes a pointer to a distinct sub-tree structure having nodes that maintain information about the ORF entries that map onto the represented interval for various non-overlapping intervals in the prefix length domain. The interval tree may therefore be regarded as a two-tiered tree structure, consisting of "first-tier" nodes forming the interval tree with respect to the non-overlapping address intervals, and where each first-tier node of the interval tree includes a pointer to "second-tier" nodes forming a separate sub-tree for the first-tier node. Where two or more ORF entries overlap along either the address prefix or prefix length dimension, the interval tree automatically associates the overlapping space with the ORF entry having the lower sequence number. As a result, the prefix length intervals that result from this further partitioning do not overlap, and therefore each prefix length interval maps to a single ORF entry. By traversing the two tiers of nodes, a route filter can quickly determine the appropriate action to apply to a route.

The length bounds for prefix length intervals within a particular address prefix interval are stored as length nodes in a prefix length sub-tree. A length node also maintains information, such as sequence number and action, about the ORF entry that maps onto the prefix length interval specified by the length node. Each prefix node of the interval tree is associated with a single prefix length sub-tree. Because a prefix node defines a non-overlapping interval along the address prefix dimension and includes a prefix length sub-tree having length nodes that define non-overlapping intervals along the prefix length dimension, each length node therefore maps to a single non-overlapping two-dimensional interval in the address prefix/prefix length two-dimensional space. As a result, the entire two-dimensional space is partitioned into non-overlapping two-dimensional intervals for which the appropriate action for a matching address is specified.

In operation, for example, to determine the filtering action for a route having a prefix value and a length value, a Border Gateway Protocol (BGP) router consults an ORF maintained in the form of an interval tree for each of its one or more BGP peers. Because the ORFs are implemented as an interval tree for each BGP peer, the router traverses the BGP peer's interval tree to find the single prefix node that matches the prefix value for the route. Then, the router traverses the prefix length sub-tree associated with the matching prefix node to determine the single length node that matches the length value for the route. Upon matching the route with the length node corresponding to the two-dimensional interval that encompasses the route, the router performs the action specified by the length node. If the length node specifies "deny," then the router drops the route. If the length node specifies "permit," the router communicates the route to the BGP peer associated with the interval tree using a route advertisement. The BGP router performs a similar operation using interval trees associated with each of the other BGP peers to determine whether to send the route to the other BGP peers.

In one embodiment, the invention is directed to a network device comprising a route filter configured to store data defining an interval tree comprising a plurality of first-tier nodes arranged in a tree data structure, wherein each of the first-tier nodes of the interval tree matches a non-overlapping interval of address values along an address dimension, wherein each of the first-tier nodes comprises one or more second-tier nodes, and wherein each of the second-tier nodes specifies a route filter action and matches a non-overlapping interval of length values along a length dimension. The network device also comprises a control unit configured to apply the route filter to a route.

In another embodiment, the invention is directed to a method of storing route filter data for a route filter in a network device as an interval tree comprising a plurality of first-tier nodes arranged in a tree data structure, wherein each of the first-tier nodes of the interval tree matches a non-overlapping interval of address values along an address dimension, wherein each of the first-tier nodes comprises one or more second-tier nodes, and wherein each of the second-tier nodes specifies a route filter action and matches a non-overlapping interval of length values along a length dimension. The method further comprises traversing, with the network device, the plurality of first-tier nodes of the interval tree to determine, for an address of a route, a first-tier node that matches an interval of address values that includes the address of the route. The method also comprises traversing the one or more second-tier nodes of the first-tier node to determine, for a length of the route, a second-tier node that matches an interval of length values that includes the length of the route, and performing a route filter action specified by the second-tier node on the route.

In another embodiment, the invention is directed to a computer-readable medium containing instructions. The instructions cause a programmable processor to store route filter data for a route filter in a network device as an interval tree comprising a plurality of first-tier nodes arranged in a tree data structure, wherein each of the first-tier nodes of the interval tree matches a non-overlapping interval of address values along an address dimension, wherein each of the first-tier nodes comprises one or more second-tier nodes, and wherein each of the second-tier nodes specifies a route filter action and matches a non-overlapping interval of length values along a length dimension. The instructions also cause the programmable processor to traverse the plurality of first-tier nodes of the interval tree to determine, for an address of a route, a first-tier node that matches an interval of address values that includes the address of the route. The instructions further cause the programmable processor to traverse the one or more second-tier nodes of the first-tier node to determine, for a length of the route, a second-tier node that matches an interval of length values that includes the length of the route, and perform a route filter action specified by the second-tier node on the route.

The techniques described herein may present several advantages. For instance, because the interval tree and each of the prefix length sub-trees are height balanced, the time taken to consecutively traverse the interval tree and one of the prefix length sub-trees to determine a matching length node for a route is on the order of log(p)+log(l), where p is the number of prefix nodes and l is the number of length nodes. For the Internet Protocol version 4 (IPv4) address family, p is at most 2N+1 and l is at most 32, where N is the number of address prefix ORF entries in the ORF. This marks an improvement over list-based and conventional tree-based ORF implementations requiring traversing on the order of N nodes to determine a match. In addition, in some embodiments, maintaining the ORF entries as an interval tree may permit eliminating duplicative entries, that is, those entries that are preempted by an overlapping entry having a higher priority. This may reduce the memory requirements for the multiple ORFs as a result.

In addition, by partitioning the address prefixes into non-overlapping intervals, the techniques described herein allow for better scaling and faster lookup of the filtering action than conventional prefix-based ORF techniques, such as those that rely on traversing an ordered list. The techniques described herein also provide advantages over a conventional tree structure ordered simply by the address prefix of the ORF entries, because the techniques described herein need not evaluate multiple matching ORF entries to determine the ORF entry having the lowest sequence number. Because a route filter list may encompass many thousands of ORF entries, looking up and evaluating even a fraction of the entries may be computationally expensive. Removing this requirement allows for more efficiency and better scaling.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 9 is the table of FIG. 8 modified to include an additional route filter entry.

DETAILED DESCRIPTION

Figure 1:
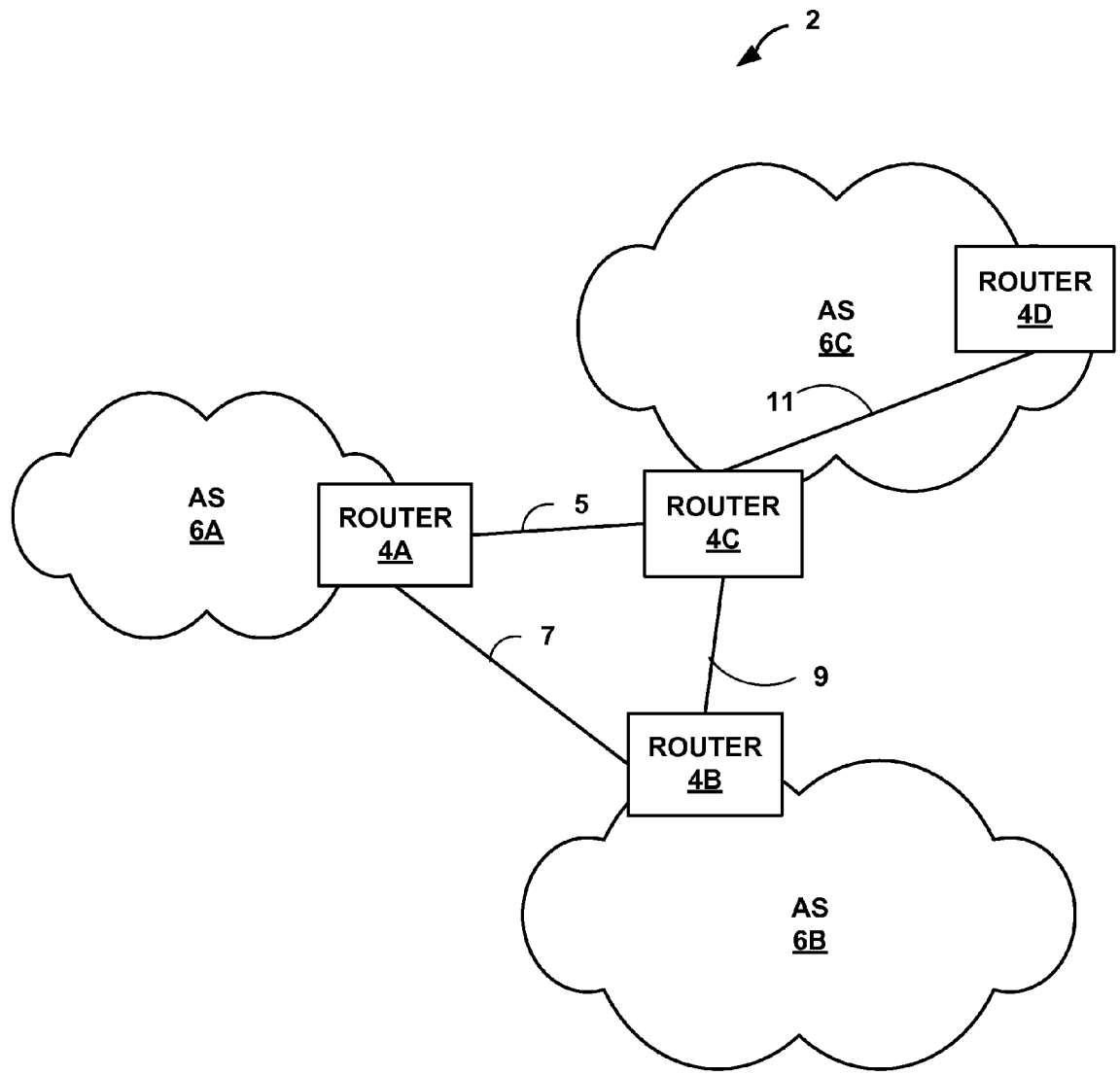
FIG. 1 is a block diagram illustrating an example system in which routers communicate data packets and exchange and filter route information in a manner consistent with the principles of the invention.

FIG. 1 is a block diagram illustrating an example system 2 in which routers 4A-4D (collectively, "routers 4") communicate data packets and exchange route information in a manner consistent with the principles of the invention. In the illustrated example of FIG. 1, routers 4 route traffic through interconnected autonomous systems (ASes) 6A-6C (collectively, "autonomous systems 6"). Routers 4 are autonomous system border routers (ASBRs). Routers 4A, 4B, and 4C are connected via external communication links 5, 7, and 9, while routers 4C and 4D are both components of autonomous system 6C and are connected via communication link 11. The communication links 5, 7, 9, and 11 may comprise one or more wired or wireless links.

Each of autonomous systems 6 may include one or more networks (not shown), such as a local area network (LAN), virtual LAN (VLAN), a virtual private network (VPN), a wide area network (WAN), or other types of networks. Each of the one or more networks may themselves include one or more computing devices (not shown), such as personal computers, laptop computers, handheld computers, workstations, servers, switches, printers, and the like. In addition, autonomous systems 6 may include a variety of other network devices for forwarding network traffic, such as routers, switches, servers, and the like. The configuration of system 2 is merely exemplary, and routers 4 may reside in a single network or within multiple networks.

In order to maintain an accurate representation of autonomous systems 6, routers 4A, 4B, and 4C periodically exchange routing information, in the form of route advertisements, in accordance with an exterior gateway protocol, such as the Border Gateway Protocol (BGP). For example, router 4A may advertise newly available routes to router 4C using BGP. In addition, in order to resolve routes within autonomous system 6C, routers 4C and 4D may periodically exchange routing information in accordance with an interior gateway protocol, such as the Routing Information Protocol (RIP) or the Open Shortest Path First (OSPF) protocol. Routers 4C and 4D may also exchange BGP information using the Internal Border Gateway Protocol (iBGP).

A route advertisement in accordance with the BGP protocol take the form of BGP UPDATE message that conveys a list of routes, where each route is described as a set of Network Layer Reachability Information (NLRI) elements. For each route, the NLRI information comprises, among other components, an expected destination address prefix and address length. The address length is an address mask specifying the number of bits of the address prefix, and the address prefix is a network address for the subnet masked by the address length.

In order to avoid receiving routes from other routers 4A, 4B and 4D that fail to conform to a routing policy for router 4C, router 4C may send outbound route filter (ORF) entries to the other routers 4A, 4B and 4D. Routers 4A, 4B and 4D use the received, respective ORF entries to build ORF data structures for performing outbound route filtering on routes intended for router 4C. In some instances, an administrator may manually configure one or more of routers 4A, 4B and 4D with an ORF that these routers may use to filter the outbound routes intended for router 4C. When routers 4A, 4B and 4D perform outbound route filtering on routes intended for router 4C in accordance with the specified ORF, router 4C may avoid expending resources for receiving and processing unwanted routing information updates.

An ORF that is associated with router 4C may be built based on ORF entries that specify, upon a match between an ORF entry and a route, whether the route shall be denied or permitted for advertisement to router 4C by routers 4A, 4B or 4D. In the example of FIG. 1, outbound route filtering is address prefix-based. Thus, in addition to specifying the action to be taken upon a route match, each address prefix ORF entry ("ORF entry") exchanged by routers 4 comprises an address prefix and prefix length field as well as a range of prefix lengths (specified by minimum and maximum prefix length fields). The values of these fields define the range of network addresses and the range of prefix lengths of routes to which the ORF entry applies. Additionally, each ORF entry may comprise a sequence number field that establishes priority among the entries.

The routers 4 of FIG. 1 support the techniques of the invention described herein in order to more quickly determine the correct action to apply to a particular route. For example, as described in detail below, for each BGP peer, router 4A implements each ORF as an interval tree data structure that is assembled from one or more ORF entries by partitioning a two-dimensional space defined by the address prefix and address prefix length domains according to the characteristics of the ORF entries. The interval tree includes first-tier nodes that represent an interval in the address prefix domain, and each first-tier node includes a pointer to a separate sub-tree for the first-tier node. The separate sub-tree contains second-tier nodes that each represents an interval in the address prefix length domain. To determine whether to forward a received route to another router, router 4A matches the route to a second-tier node of an interval tree that implements the ORF for the intended router. The matching node specifies the appropriate action for the route, which router 4A subsequently performs. In this manner, router 4A may achieve efficient route filtering of routes for BGP or another routing protocol.

Although the principles of this invention are described with respect to routers and outbound route filters, they are applicable to other network devices that implement various processes involving prefix-based or range-based matching. For example, the invention may be applied to an asynchronous transfer mode (ATM) switch, a local area network (LAN) switch, an interface card, or many other types of devices. In addition, the invention may be applied to inbound route filtering, multi-protocol label switching (MPLS) label lookup, and virtual local area network (VLAN routing) (such as IEEE 802.1 Q-in-Q routing).

Figure 2:
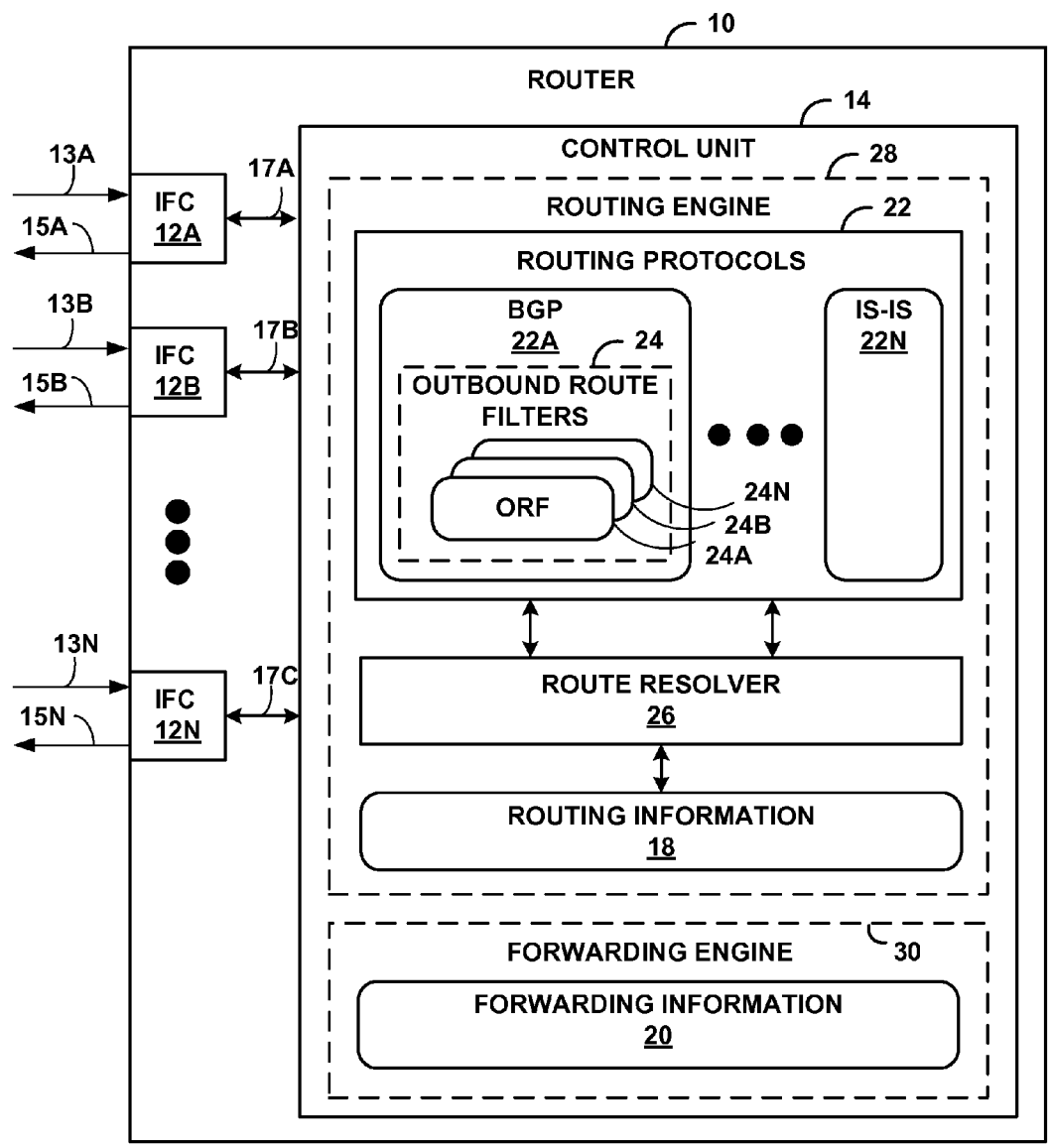
FIG. 2 is a block diagram illustrating an exemplary embodiment of a router that filters routes in a manner consistent with the principles of the invention.

FIG. 2 is a block diagram illustrating an exemplary router 10 that implements outbound route filters for a routing protocol in accordance with an embodiment of the invention. Router 10 may operate substantially similarly to routers 4 from FIG. 1.

In this example, router 10 includes interface cards 12A-12N (collectively, "IFCs 12") that receive packets via inbound links 13A-13N (collectively, "inbound links 13") and send packets via outbound links 15A-15N (collectively, "outbound links 15"). IFCs 12 are typically coupled to links 13, 15 via a number of interface ports. Router 10 also includes a control unit 14 that determines routes of received packets and forwards the packets accordingly via IFCs 12.

In general, control unit 14 manages the functionality of the router and may comprise one or more of a processor, a programmable processor, a general purpose processor, an integrated circuit, an Application Specific Integrated Circuit (ASIC), a Field Programmable Gate Array (FPGA), or any type of hardware unit capable of implementing the techniques described herein. Control unit 14 may further include computer-readable storage media, such as dynamic memory (e.g., Random Access Memory or RAM, dynamic RAM or DRAM, and a cache) and/or static memory (e.g., static RAM or SRAM, a Read Only Memory or ROM, and Flash memory), and storage devices, such as CD-ROMs, hard drives, RAM drives, and Digital Video Disc (DVD) drives. In some instances, the computer-readable storage medium may include instructions that cause a programmable processor to implement the principles of the invention described herein.

Control unit 14 comprises forwarding engine 30 and routing engine 28. Routing engine 28 represents a hardware and/or software module that performs the routing functions of router 10, such as calculating packet routes and executing routing protocols to maintain routing tables. Routing engine 28 maintains routing information 18 that describes the topology of a network and, in particular, routes through the network. The routing information 18 may include, for example, route data that describes various routes within the network, and corresponding next-hop data indicating appropriate neighboring devices within the network for each of the routes.

Routing engine 28 comprises routing protocols 22A-22N (collectively, "routing protocols 22"). Routing protocols 22 represent a set of routing protocols implemented via routing engine 28, for example, via one or more software processes. Router 10 exchanges routing information 18 with other routing devices in accordance with routing protocols 22, thereby learning the topology of the network and, more specifically, routes to other network devices within the network. Routing protocols 22 may include exterior routing protocols to exchange routing information 18 with routers of other domains or autonomous systems, e.g. via BGP routing protocol 22A ("BGP 22A"). In addition, or alternatively, routing protocols 22 may include interior routing protocols, e.g., IS-IS routing protocol 22N, to learn of "internal" routes, i.e., routes to destinations within the same network as router 10.

Routing information 18 exchanged with other routing devices may be exchanged in the form of network layer reachability information (NLRI) carried within routing protocol update messages, which router 10 advertises for destinations to which router 10 offers reachability. In addition to advertising routes, router 10 also may send routing protocol messages to withdraw routes to destinations for which router 10 no longer offers reachability.

Routing engine 28 further comprises route resolver 26 that generates forwarding information 20 that associates destination information, such as IP address prefixes, with specific forwarding next hops (FNHs) and corresponding interface ports of IFCs 12. Forwarding information 20 may, therefore, be thought of as based on the information contained within routing information 18. Route resolver 26 maintains routing information 18 and forwarding information 20 in the form of one or more tables, databases, link lists, radix trees, flat files, or any other data structures. Routing engine 28 provides forwarding information 20 to forwarding engine 30.

Forwarding engine 30 represents a hardware and/or software module that performs the forwarding functions of the router, such as packet validation, route lookup, and delivery. In some embodiments, forwarding engine 30 is distributed in whole or in part to the IFCs 12 in order to perform the requisite forwarding functions on incoming packets in parallel. Forwarding information 20 associates network destinations with specific next-hops and corresponding interface ports. In general, when router 10 receives a packet via one of inbound links 13, routing engine 28 determines a destination and associated next-hop for the packet in accordance with routing information 18 and forwarding engine 30 forwards the packet on one of outbound links 28 to the corresponding next-hop in accordance with the forwarding information 20 based on the destination of the packet.

BGP 22A executed by routing engine 28 performs address prefix-based outbound route filtering on routes. The BGP 22A may filter routes for a variety of purposes, such as to reduce the number of BGP UPDATE messages sent on the network, to economize the number of routes stored in routing information 18 of router 10, or to implement a security or other routing policy in router 10. Router 10 receives ORF entries comprising outbound route filter information from other BGP speaking routers (or "BGP peers") on inbound links 13. Outbound route filters are described in detail in "Outbound Route Filtering Capability for BGP-4," an internet draft of the Internet Engineering Task Force (IETF), which is incorporated herein by reference in its entirety.

Address prefix ORFs are a specialized type of ORF that provides a routing protocol with the ability to match routes based upon the range of addresses and prefix lengths defined by one or more address prefix ORF entries in the address prefix ORF. Address prefix ORFs and address prefix ORF entries are described in detail by "Address Prefix Based Outbound Route Filter for BGP-4," an internet draft of the Internet Engineering Task Force (IETF), which is incorporated herein by reference in its entirety. An address prefix ORF entry extends the type specific portion of the generic ORF entry described in "Outbound Route Filtering Capability for BGP-4." As used hereinafter, "ORF entry" refers to an address prefix ORF entry.

Each of address prefix outbound route filters 24A-24N (collectively, "ORFs 24") in router 10 may correspond to a respective BGP peer, and specifies the actions that router 10 should take when determining whether to forward a route to that BGP peer. Each of ORFs 24 may be based on ORF configuration data received from one or more address prefix ORF entries (illustrated in FIG. 6). An ORF entry is carried within a BGP ROUTE-REFRESH message, and indicates whether to add or remove the contents of the ORF entry from a specified ORF. For an address prefix type of ORF entry, the ORF entry is encoded with sequence number, prefix, length, min length, max length, and match fields. The sequence number determines the relative priority among the ORF entries in one of ORFs 24. Typically, by convention, a lower sequence number indicates a higher relative priority. The prefix field of an ORF entry contains an address prefix of an address family, e.g., IPv4. The length field specifies the bit-length of the prefix contained in the prefix field (a length of zero indicates that the prefix matches all addresses of the address family). Min length and max length contains the minimum and maximum prefix lengths that are required for a route to match an ORF entry. Where min length or max length are zero, the field is considered unspecified. Finally, the match field specifies the action to be taken upon a match between an ORF entry and a route, in particular, "permit," or "deny." In some embodiments, an ORF entry is extensible and may include other attributes that narrow or expand the scope of routes to which it applies or that perform other functions.

When router 10 receives outbound route filter information from a BGP peer, e.g., in the form of one or more ORF entries, routing engine 28 passes the information to BGP 22A for processing. BGP 22A modifies the corresponding ORF 24 for the BGP peer to add or remove the route filter information as specified by the received ORF entry. In this way, BGP 22A may match future routes with current filter information from the BGP peer.

In accordance with the principles of the invention, BGP 22A implements each of ORFs 24 as an interval tree data structure. Therefore, rather than matching, for example, a received route to ORF entries for one of ORFs 24 that are stored as a list, BGP 22A matches the route to nodes in first and second tiers of the interval tree for each of the ORFs 24. The matching second-tier node specifies the appropriate action for the route, which router 10 subsequently performs. In this manner, router 10 may achieve efficient route filtering of routes for BGP. Although described with respect to BGP, the interval tree techniques described herein may be applicable to other interior and exterior routing protocols, such as Routing Information Protocol (RIP), Open Shortest Path First (OSPF), Intermediate System to Intermediate System (IS-IS), Internal Border Gateway Protocol (iBGP), Exterior Gateway Protocol (EGP), and the like, as well as services involving range-based lookup such as MPLS label lookup, and VLAN routing.

Generally, BGP 22A assembles an interval tree based on one or more ORF entries received for one of ORFs 24 by partitioning a two-dimensional space defined by the address prefix dimension and prefix length dimension according to the values of the ORF entries. BGP 22A achieves this partitioning by determining the two-dimensional interval encompassed, for each ORF entry, by the range of addresses defined by the address prefix within an address prefix dimension as well as the range of prefix lengths specified by the values of the minimum and maximum prefix lengths for the entry within a prefix length dimension.

Where the intervals of two or more ORF entries to be added overlap, the overlapping space takes on the characteristics of the address prefix ORF entry that has the lowest sequence number (i.e., the highest priority). That is, the address prefix ORF entry with the lowest sequence number that intersects the overlapping space determines whether matching addresses are either permitted for advertisement or denied. As a result, the two-dimensional space is partitioned into non-overlapping two-dimensional intervals for which the appropriate action for a matching address is known. In some embodiments, a default action is specified for intervals for which the action has not yet been specified by a received ORF entry—generally either "permit" or "deny." In other embodiments, each of ORFs 24 includes a special ORF entry that matches all addresses and prefix lengths.

For each of ORFs 24, the non-overlapping two-dimension intervals are reified as an interval tree. The interval tree comprises a first tier of prefix nodes, with each prefix node representing an address prefix interval, that is, a non-overlapping interval in the address prefix dimension. In some embodiments, the interval tree is height-balanced and ordered according to the address prefix dimension. The addition of an address prefix ORF entry to an ORF may result in a re-partitioning of the two-dimension space and the addition of one or more prefix nodes to the interval tree. Accordingly, for ordered, height-balanced implementations, the size of the interval tree, measured by the number of prefix nodes, increases on the order of the number of address prefix ORF entries, N. However, the interval tree size is upper-bounded by the at most 2N+1 non-overlapping intervals that can be formed by the N address prefix ORF entries.

As a result of overlap along the address prefix dimension, whereby multiple ORF entries of an ORF may match a particular address prefix interval, each address prefix interval is itself divided, during partitioning, into prefix length intervals according to the minimum and maximum prefix length and the sequence number fields of the overlapping ORF entries. For example, a first ORF entry encompassing a particular address prefix interval may be received that only matches routes having lengths 16-19, while a second ORF entry encompassing the same address prefix interval may be received that only matches routes having lengths 20-32. During partitioning, BGP 22A automatically divides that shared address prefix interval into two intervals along the prefix length dimension: 16-19 and 20-32. When multiple address prefix ORF entries overlap in the prefix length dimension as well as the address prefix dimension, BGP 22A assigns the overlapping space the action (e.g., "permit" or "deny") of the ORF entry having the lowest sequence number.

Every prefix node in the interval tree includes pointer to second tier of nodes, in the form of a distinct prefix length sub-tree, to accommodate the divisions along the address prefix length dimension of the two-dimensional space. In some embodiments, the prefix length sub-tree for each prefix node of the interval tree is height balanced and ordered according to address prefix length. Each prefix length sub-tree for a prefix node includes length nodes, which are second-tier nodes of the interval tree representing a single prefix length interval within the address prefix interval corresponding to the prefix node. As a result, every non-overlapping two-dimensional interval within the two-dimensional space defined by the address prefix and address prefix length dimensions is associated with a single length node in a prefix length sub-tree that is itself contained by a prefix node in the interval tree. Additionally, length nodes may maintain information specifying the sequence number for the interval as well as the action to be taken (e.g., "permit" or "deny") upon a match between the interval and a route. For ordered, height-balanced implementations, the prefix length sub-tree for each prefix node will contain at most the lesser of 2N+1 or L length nodes, where L is the maximum prefix length for an address family (e.g., 32 for IPv4). In some embodiments, the prefix length sub-tree may be implemented as a list or other data structure.

When routing engine 28 receives a route advertisement from a BGP peer of router 10, routing engine 28 passes the route advertisement to BGP 22A, which updates routing information 18 based on the route advertisement. BGP 22A also determines whether to forward the routes received in the advertisement to other BGP peers. Generally, for each of the other BGP peers, BGP 22A determines which of ORFs 24 is associated with the BGP peer. BGP 22A then queries the interval tree of the appropriate one of ORFs 24. To query the interval tree, BGP 22A traverses the interval tree to find the single prefix node that matches the prefix value for a particular route. Then, the BGP 22A traverses the prefix length sub-tree associated with the matching prefix node to determine the single length node that matches the length value for the route. Upon matching the route with the length node having a range that encompasses the route, BGP 22A directs routing engine 14 to perform the action specified by the matching length node. If the length node specifies "deny," then routing engine 14 drops the route. If "permit," routing engine 14 communicates the route to the intended BGP peer using a route advertisement. By utilizing an interval tree implementation of ORFs 24 in this manner, router 10 may achieve efficient route filtering of routes for BGP or another routing protocol.

Figure 3:
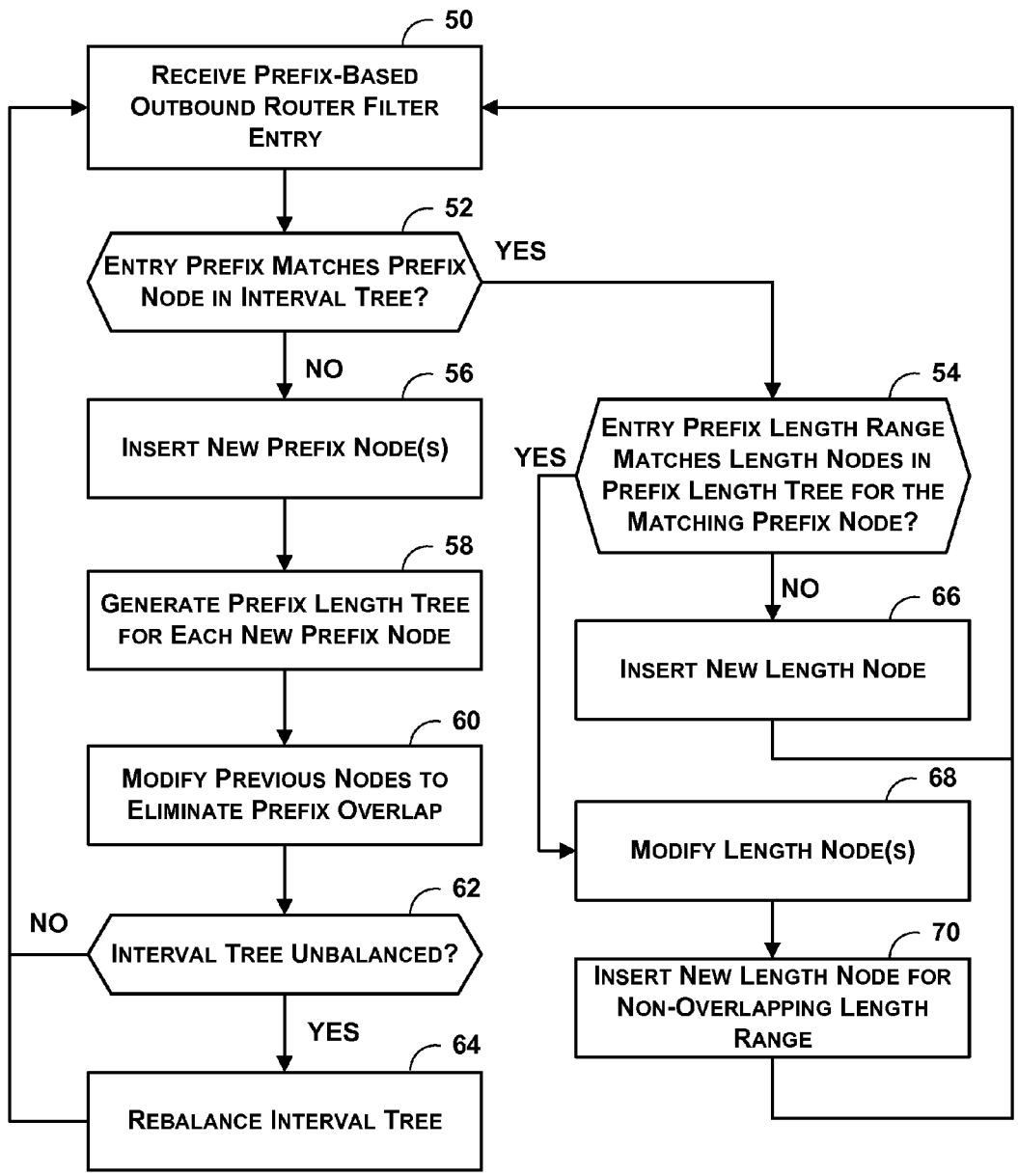
FIG. 3 is a flowchart illustrating an exemplary operation of a router that, upon receiving a prefix-based outbound route filter entry, modifies an outbound route filter interval tree in accordance with the principles of the invention.

FIG. 3 is a flowchart illustrating an exemplary operation, for the router 10 of FIG. 2, for receiving a prefix-based ORF entry and modifying an interval tree of one of ORFs 24 in accordance with the principles of the invention. At an initial state, an interval tree of the ORF may be empty. That is, the interval tree may comprise no prefix nodes. In some embodiments, the interval tree for each of ORFs 24 includes, at an initial state, a prefix node that matches any address in the address family as well as a length node associated with the prefix node that matches all address lengths for the address family.

BGP 22A of router 10 receives an ORF entry from a BGP peer via routing engine 28 (50). BGP 22A resolves the applicable address prefix from the entry's prefix and length values and queries the interval tree to determine whether the address prefix encompasses an address range equivalent to that specified by any prefix node in the interval tree (52). In some instances, an address prefix encompasses an address range that is equivalent to the aggregate range specified by a plurality of prefix nodes.

If there is an equivalent prefix node (YES branch of 52), BGP 22A then queries the length interval tree for that prefix node to determine whether any of the prefix lengths specified by the length nodes of the length interval tree, alone or in a combination, match the prefix lengths specified by the minimum and maximum length values of the ORF entry. BGP 22A updates the interval tree in accordance with its determination (54). For the update, in some instances, there will be no overlap between the prefix lengths encompassed by the ORF entry and the prefix lengths specified by the length nodes (NO branch of 54). In these instances, BGP 22A inserts an additional length node into the length interval tree (66). The additional length node, besides specifying a prefix length range for the node, includes the sequence number and action of the ORF entry. In other instances, the prefix length range of the ORF entry and those of the length nodes overlap in part or in sum (YES branch of 54). For any overlapping prefix length ranges, BGP 22A may modify the specified length ranges of the length nodes to account for overlap (68). As another aspect of the modification step, BGP 22A compares the sequence number of the ORF entry with the sequence number for the length nodes having overlapping prefix length ranges. If the sequence number for the ORF entry is lower, BGP 22A supplants the current action with the action specified by the ORF entry. BGP 22A additionally inserts an additional length node for the non-overlapping prefix length range (70). In some instances, BGP 22A may need to update prefix length sub-trees for multiple prefix nodes.

If there is not an equivalent prefix node or nodes (NO branch of 52), BGP 22A inserts an additional one or more prefix nodes into the interval tree (56). In some cases, the address range encompassed by the prefix of the ORF entry will not overlap with any of the prefix nodes of the interval tree, and BGP 22A may insert a single prefix node for the ORF entry. Where there is overlap, however, insertion is more complex and may require a plurality of new prefix nodes to account for the new intervals defined by the overlapping and non-overlapping spaces.

BGP 22A generates a new prefix length sub-tree for each of the new prefix nodes of the interval tree (58). The prefix length sub-tree includes length nodes that may incorporate information from the prefix length sub-trees of other prefix nodes as well as information from the ORF entry.

After structuring the new prefix nodes, BGP 22A may modify pre-existing prefix nodes to eliminate any overlap between the address ranges of the respective nodes (60). For example, a received ORF entry may have a prefix that encompasses an address range that is a subset of the range of addresses defined by a pre-existing prefix node of the interval tree. In this case, BGP 22A may first insert additional prefix nodes and then modify the pre-existing prefix node to account remove the portions of its address range that are now defined by the new prefix nodes.

Finally, BGP 22A determines whether, by inserting additional prefix nodes, the interval tree became unbalanced (62). If so, BGP 22A rebalances the interval tree (64). This results in a height-balanced interval tree for faster lookup operations.

In some embodiments, router 10 is manually provisioned with a list of ORF entries for one of ORFs 24. In these instances, router 10 performs the operation illustrated in FIG. 3 on each successive ORF entry in the list in order to generate the interval tree for the ORF.

In some embodiments, each of ORFs 24 includes an associated list of ORF entries in addition to the interval tree for the ORF. When router 10 receives additional ORF entries for ORF modifications (e.g., a direction to add or remove the contents of an ORF entry), router 10 modifies the list of ORF entries in accordance with the received modifications and, using the list of ORF entries, reconstructs the interval tree from an initial state.

Figure 4:
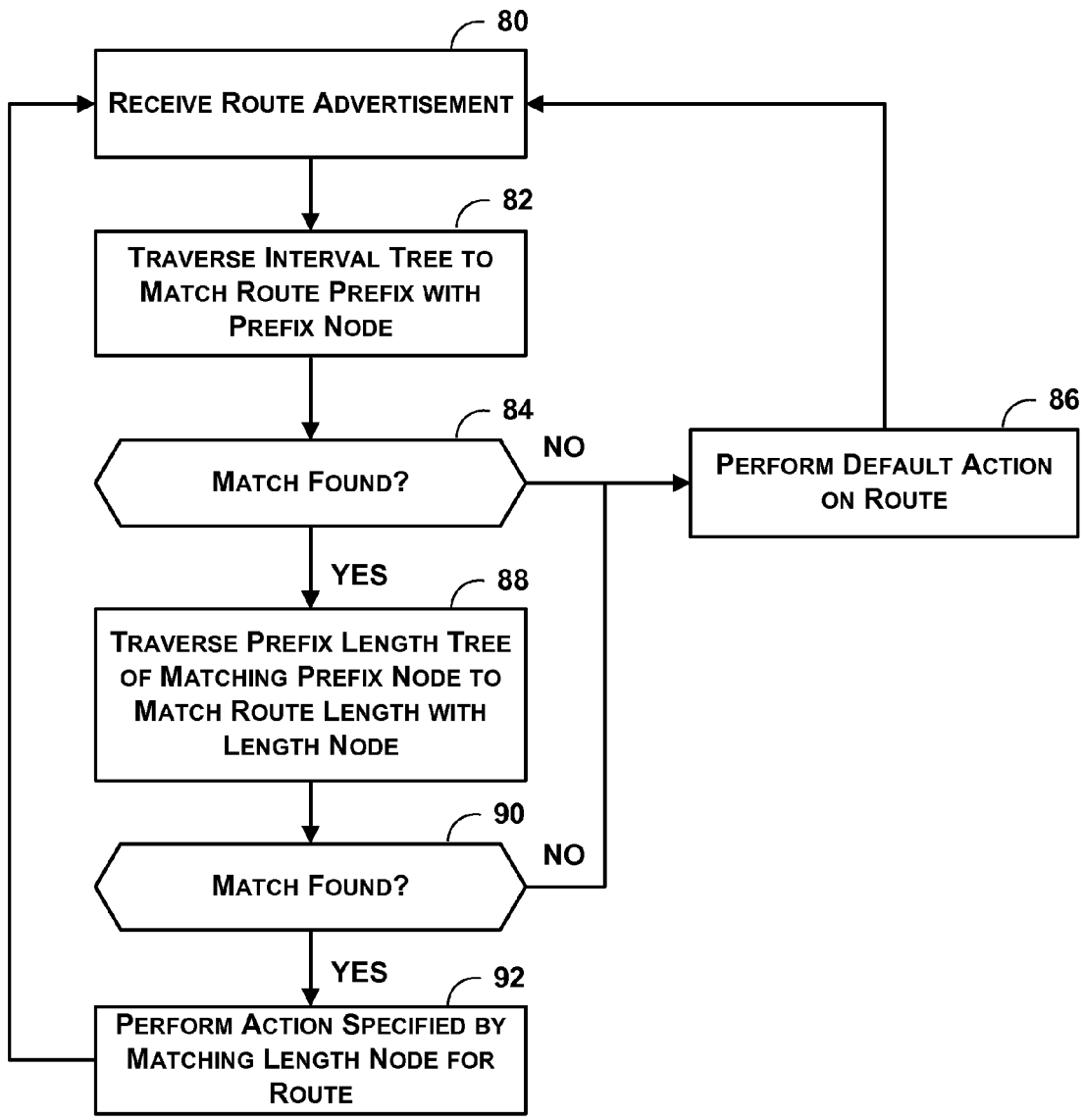
FIG. 4 is a flowchart illustrating an exemplary operation of a router that performs the route filtering techniques described in this disclosure.

FIG. 4 is a flowchart illustrating an exemplary operation, of the router of FIG. 2, for performing the route filtering techniques using an interval tree. Generally, router 10 receives a route advertisement from a BGP peer in the form of a BGP UPDATE message (80). Router 10 must determine to which BGP peers it will forward the BGP UPDATE message. In some cases, though, router 10 may itself generate a route advertisement that router 10 will send to other BGP peers, rather than receiving a route advertisement. Each route carried by the route advertisement includes NLRI information such as an expected destination address prefix and address length. Router 10 passes the route advertisement to BGP 22A via routing engine 28. Generally, for one or more of ORFs 24, BGP 22A queries the interval tree of that ORF for each route in the route advertisement. First, BGP 22A traverses the interval tree to determine whether there is a matching prefix node for the expected destination address prefix of the route (82). If there is no matching prefix node in the interval tree for the route prefix (NO branch of 84), BGP 22A performs the default action of router 10 (e.g., "deny") on the route (86). If, however, BGP 22A matches the route prefix to a prefix node (YES branch of 84), BGP 22A then traverses the prefix length sub-tree of the matching prefix node to determine whether there is a length node in the prefix length sub-tree that matches the address length of the route (88). If there is no matching length node for the route address length (NO branch of 90), BGP 22A performs the default action of router 10 on the route (86). If BGP 22A matches the route length to a length node (YES branch of 90), BGP 22A performs the action specified by the matching length node (92). That is, depending on the specified action, BGP 22A either permits (i.e., advertises) the route to the BGP peer corresponding to the one of ORFs 24 that comprises the interval tree, or BGP 22A denies (i.e., does not advertise) the route.

Figures 5, 6:
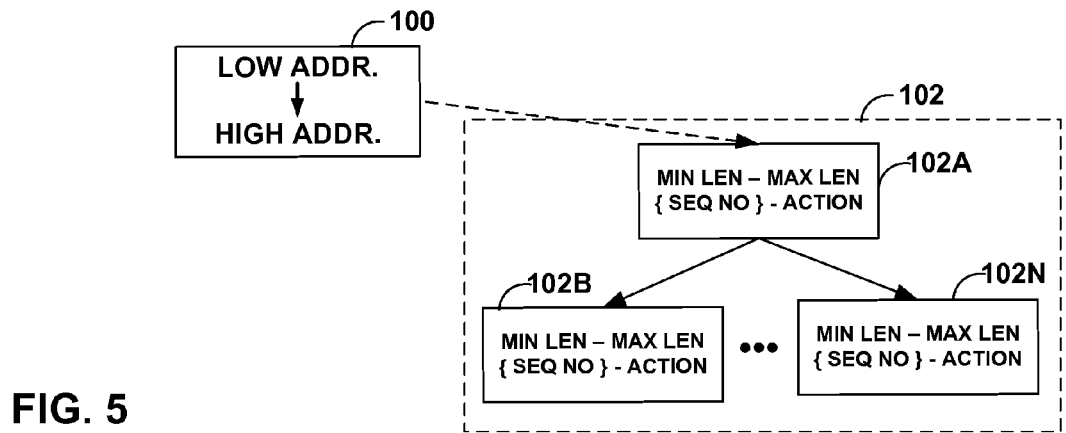
FIG. 5 is a block diagram illustrating a prefix node having a prefix length sub-tree for an outbound route filter interval tree.
FIG. 6 is a table having a number of address prefix outbound route filter entries, the content of which are embodied in the interval tree of one of outbound route filters 24 of FIG. 2.

FIG. 5 is a block diagram illustrating an abstract prefix node 100 of an interval tree generated in accordance with the techniques described herein. Prefix node 100 matches route addresses, for a particular addresses family, that are within the inclusive range of addresses defined by the low address ("low addr.") and high address ("high addr.") values stored within prefix node 100 of the interval tree data structure. In addition, prefix node 100 includes a pointer to another tree, in this case a single prefix length sub-tree 102 having length nodes 102A-102N (collectively, "length nodes 102"). Any of length nodes 102 matches a route address length when the address length is in the inclusive range defined by the values of minimum length and maximum length for the length node. In addition, each of length nodes 102 has a sequence number and an action value that specify, respectively, the relative priority of the ORF entry that maps to the length node and the action to be taken on a route match. As illustrated in FIG. 5, prefix length tree 102 is generally a height-balanced tree ordered by the prefix length value. However, in some embodiments, prefix length tree 102 may be implemented as a list, hash, or other data structure.

FIG. 6 is a table 110 having address prefix ORF entries 112A-112D (collectively, "ORF entries 112") that define the content of the interval tree of one of ORFs 24 for router 10 of FIG. 2. In some embodiments, in addition to maintaining an interval tree, each of ORFs 24 also maintains a table 110 in order to reconstruct the interval tree each time an ORF entry is received to add, modify, or remove one or more elements to or from the table. Although FIG. 6 illustrates ORF entries for the Internet Protocol version 4 (IPv4) address family, the techniques of the invention also apply to other address families, such as Internet Protocol version 6 (IPv6).

Each of ORF entries 112 has values for the sequence number, prefix, length, minimum length, maximum length, and match fields. For example, ORF entry 112B has sequence number 1, which indicates that ORF entry 112B has the highest priority among ORF entries 112. The length value specifies the number of most significant bits of the prefix value that are relevant for prefix matching. For instance, ORF entry 112B has prefix value 2.2.2.0 with 24 significant bits.

In accordance with the rules for address prefix ORF matching described in detail in "Address Prefix Based Outbound Route Filter for BGP-4" (incorporated by reference above), taken alone, ORF entry 112B matches routes that are 1) more specific than, or equal to, the prefix and length values of the ORF entry, and 2) because both the minimum and maximum length fields are specified, have a length value that is within the inclusive length range 25-30. Therefore, ORF entry 112B matches routes having addresses in the inclusive range 2.2.2.0-2.2.2.252 and a prefix length within the inclusive length range 25-30. As another example, ORF entry 112D, which has a prefix length of zero, matches all addresses in IPv4. ORF entry 112D also matches all route address lengths because of the all-encompassing minimum and maximum range values. Moreover, ORF entry 112D has the highest sequence number and hence the lowest priority number among ORF entries 112. In this respect, ORF entry 112D is a catch-all entry for all routes that do not match any of the other ORF entries.

Figure 7:
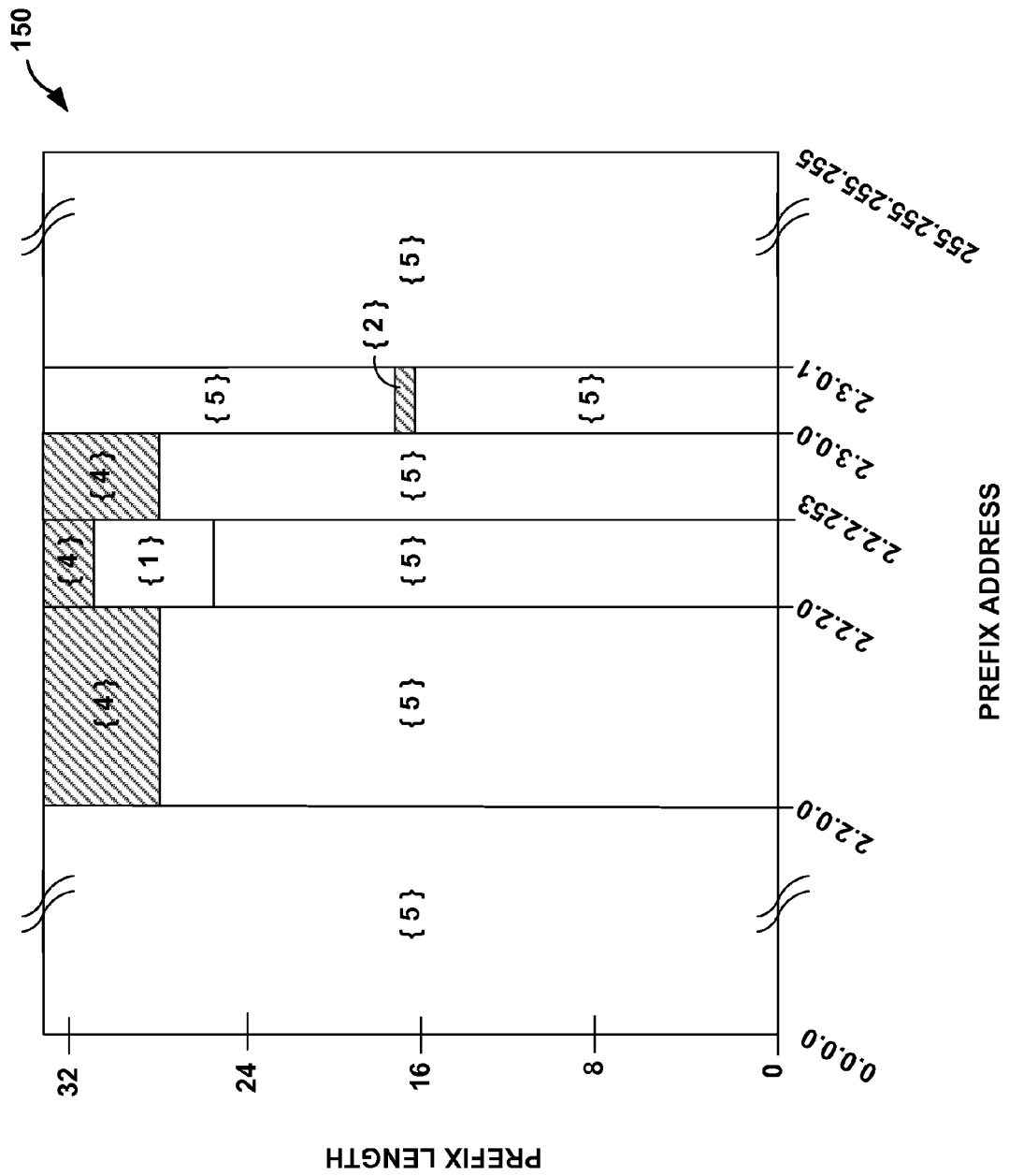
FIG. 7 is a two-dimensional map illustrating the partitioning of a number of address prefix outbound route filter entries into non-overlapping intervals in a manner consistent with the invention.

FIG. 7 is a two-dimensional map 150 that illustrates the conceptual partitioning of ORF entries 112 of FIG. 6 into non-overlapping intervals in a manner consistent with the invention. The x-axis ("Prefix Address") of the map 150 illustrates the range of all possible addresses in the IPv4 address domain, and the y-axis ("Prefix Length") shows the range of possible prefix length values in the address prefix length domain. Because the two-dimensional domain of map 150 encompasses all possible (address, prefix length) pairs in IPv4, every route received by router 10 may be mapped to a specific point on map 150 in order to determine the appropriate action to apply to the route. A hash-patterned interval indicates that the specified action for routes that match the interval is "permit." Unhashed intervals indicate that the specified action for routes that match the interval is "deny." FIG. 7 is further explained below with reference to FIG. 8.

Figure 8:
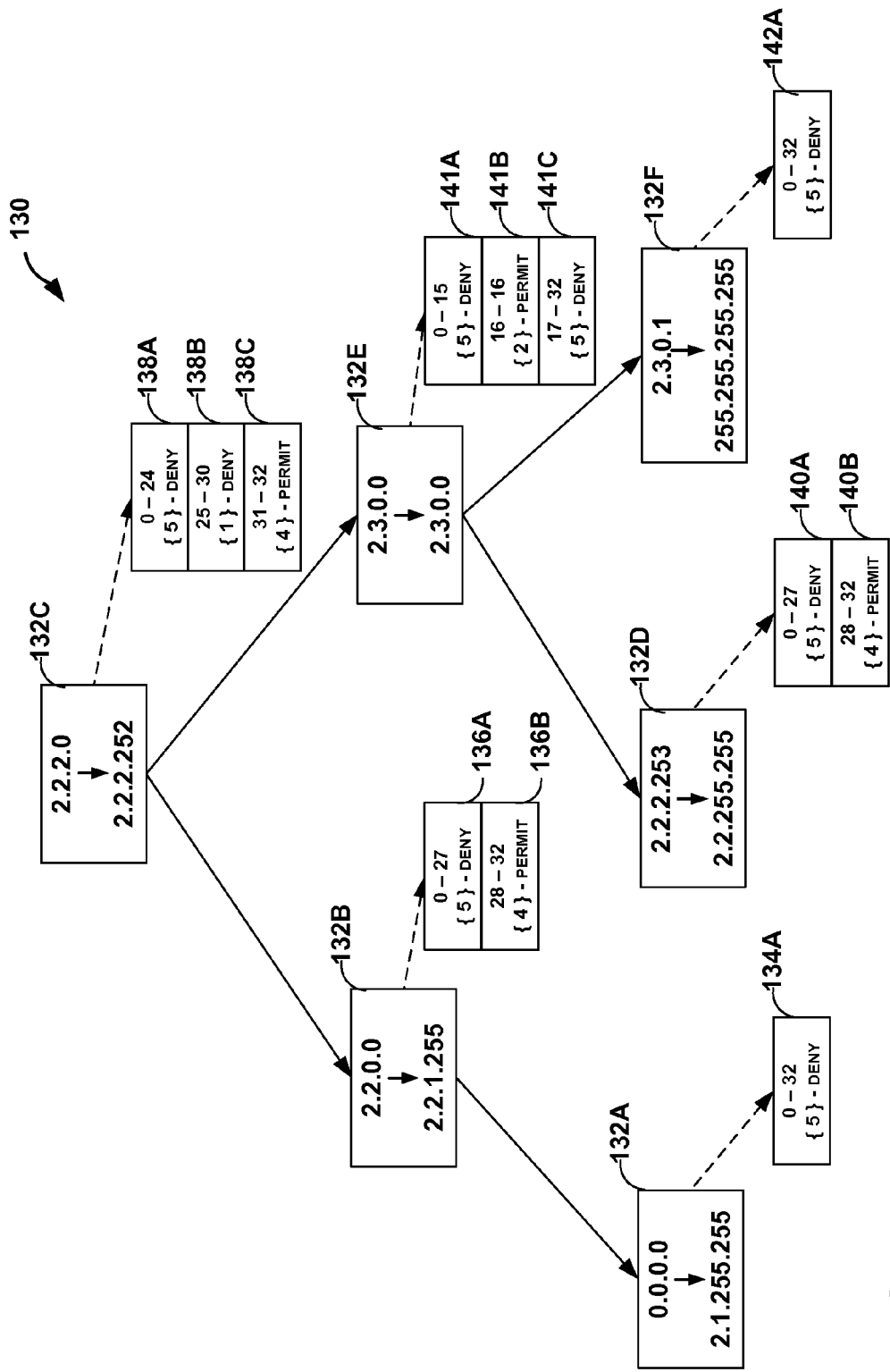
FIG. 8 is a block diagram of an outbound route filter interval tree generated in accordance with the principles of the invention.

FIG. 8 is a block diagram illustrating the structure and contents of an interval tree 130 that corresponds to one of ORFs 24 of FIG. 2 and is generated in accordance with the principles of the invention. In this example, interval tree 130 includes contents represented by ORF entries 112 of FIG. 6. As described above with respect to FIG. 3, BGP 22A may generate interval tree 130 by inserting information corresponding to each of ORF entries 112 into the interval tree 130 as a first tier of prefix nodes and a second tier of length nodes. Once BGP 22A has inserted the content of all of the ORF entries 112 into interval tree 130, every length node of the interval tree maps to a single one of the two-dimensional partitions conceptually illustrated by FIG. 7.

For example, ORF entry 112C of FIG. 6 has a prefix value of 2.2.0.0 and a length value of 16. The ORF entry 112C therefore matches all routes having IPv4 addresses with the value 2.2 as a prefix and having a prefix length within the inclusive length range 28-32. ORF entry 112B has a prefix that matches a range of addresses that overlaps with the range matched by ORF entry 112C. In particular, as described above, ORF entry 112B matches routes having IPv4 addresses in the inclusive range 2.2.2.0-2.2.2.252 and a prefix length within the inclusive length range 25-30. The addresses matched by ORF entry 112B are a subset of the addresses matched by ORF entry 112C, and effectively divide the addresses matched by ORF entry 112C into three partitions along the address prefix dimension, as illustrated in FIG. 7. In addition, ORF entry 112D is a catch-all entry and matches all possible routes.

Prefix nodes 132B-132D represent the partitioning of the address prefix dimension that results from the insertion, by BGP 22A, of the prefix values of ORF entries 112B and 112C into the interval tree. Prefix node 132B represents addresses 2.2.0.0 through 2.2.1.255 that match ORF entry 112C. Prefix node 132C represents addresses 2.2.2.0 through 2.2.2.252 that match both ORF entries 112B and 112C. Finally, prefix node 132D represents addresses 2.2.2.253 through 2.2.2.255.255 that match ORF entry 112C. The other prefix nodes of interval tree 130 represent similar divisions along the prefix address dimension that result after BGP 22A inserts all of ORF entries 112.

Each of first-tier prefix nodes 132 of interval tree 130 includes a pointer to a separate prefix length sub-tree having one or more second-tier length nodes. Although each prefix length sub-tree is illustrated for simplicity in FIG. 7 as a list of length nodes (e.g., length nodes 138A-138C for prefix node 132), a prefix length sub-tree is generally a height-balanced tree ordered by the prefix length value. The sequence number and the minimum and maximum length fields of ORF entries 112 determine the content of the length nodes in a prefix length sub-tree. Furthermore, each of the length nodes illustrated in FIG. 8 corresponds to a single two-dimensional interval in map 150 of FIG. 7.

Prefix node 132C, for example, includes a pointer to prefix length sub-tree comprising length nodes 138A-138C (collectively, "length nodes 138"). Length nodes 138 detail the manner in which the address range encompassed by prefix node 132C (i.e., addresses in the inclusive range 2.2.2.0-2.2.2.252) is partitioned along the prefix length dimension. ORF entries 112B, 112C, and 112D all overlap, along the prefix address domain, in the address range encompassed by prefix node 132C. Furthermore, ORF entry 112D matches any route regardless of the length value of the route. However, ORF entry 112B matches only those routes having an address prefix that matches the prefix value for ORF entry 112B and also having a length value between 25 and 30. Likewise, ORF entry 112C matches only those routes having an address prefix that matches the prefix value for ORF entry 112C and also having a length value between 28 and 32.

Because ORF entry 112B has the lowest sequence number among these overlapping ORF entries, ORF entry 112B has priority over ORF entries 112C and 112D. Therefore, as part of the process of building interval tree 130, BGP 22A generates a partition along the prefix length dimension having a range, 25-30, that corresponds to the minimum and maximum length values for ORF entry 112B. BGP 22A then inserts length node 138B, to represent this partition, into the prefix length sub-tree for prefix node 132C. Length node 138B includes the sequence number and match action specified by ORF entry 112B.

Similarly, based on the sequence numbers, ORF entry 112C has priority over ORF entry 112D but is subordinate to ORF entry 112B. BGP 22A generates a partition along the prefix length dimension having a range, 31-32, that is based on the minimum and maximum length values for ORF entry 112C. This partition does include prefix length values already allocated to length node 138B, which has a higher priority. BGP 22A then inserts length node 138C, to represent this partition, into the prefix length sub-tree for prefix node 132C. Length node 138C includes the sequence number and match action specified by ORF entry 112C. Finally, based on the values of ORF entry 112D, BGP 22A generates and inserts length node 138A into the prefix length sub-tree for prefix node 132C.

As router 10 receives additional ORF entries from BGP peers, router 10 passes the contents of the additional ORF entries to BGP 22A, which modifies interval tree 130 accordingly, such as by inserting information corresponding to the additional ORF entries into interval tree 130. In addition, router 10 may receive ORF entries that direct BGP 22A to remove or modify contents of interval tree 130. In such cases, BGP 22A may remove and/or modify the prefix nodes of interval tree 130 as well as the length nodes included in the prefix nodes.

FIG. 9 is a table 160 having address prefix ORF entries 162A-162E (collectively, "ORF entries 162") that define the content of the interval tree of one of ORFs 24 for router 10 of FIG. 2. Table 160 includes some ORF entries that are identical to those of table 110 of FIG. 6, but table 160 includes an additional ORF entry 162E received by BGP 22A from a BGP peer.

Figure 10:
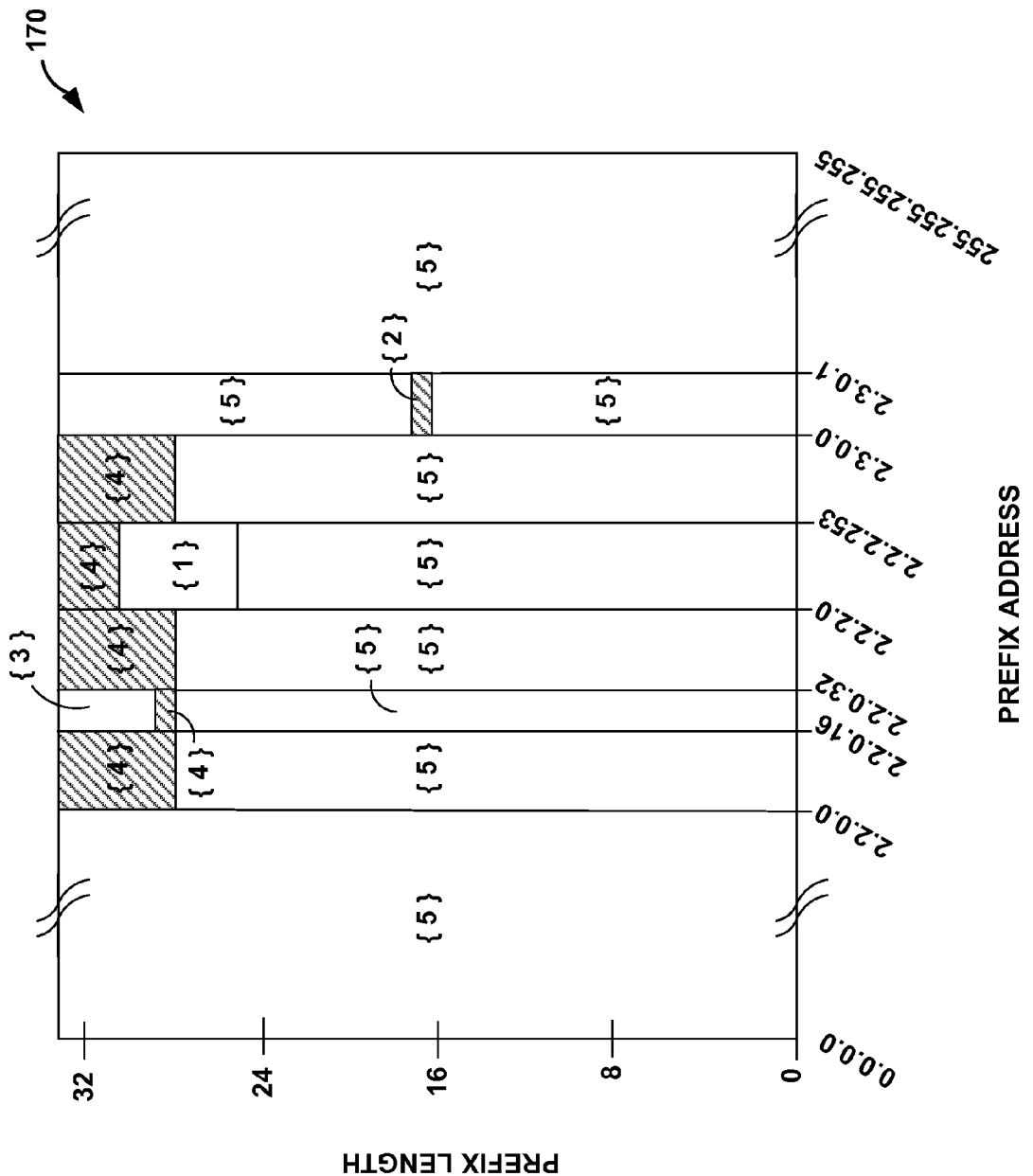
FIG. 10 is a two-dimensional map modified to illustrate the repartitioning, in a manner consistent with the invention, of the map of FIG. 7 to accommodate the additional route filter entry of FIG. 9.

FIG. 10 is a two-dimensional map 170 that illustrates the conceptual partitioning of ORF entries 162 of FIG. 9 into non-overlapping intervals in a manner consistent with the techniques of the invention. Two-dimensional map 170 represents the two-dimensional map 150 of FIG. 7 that has been modified to incorporate the values of additional ORF entry 162E in table 160.

Figure 11:
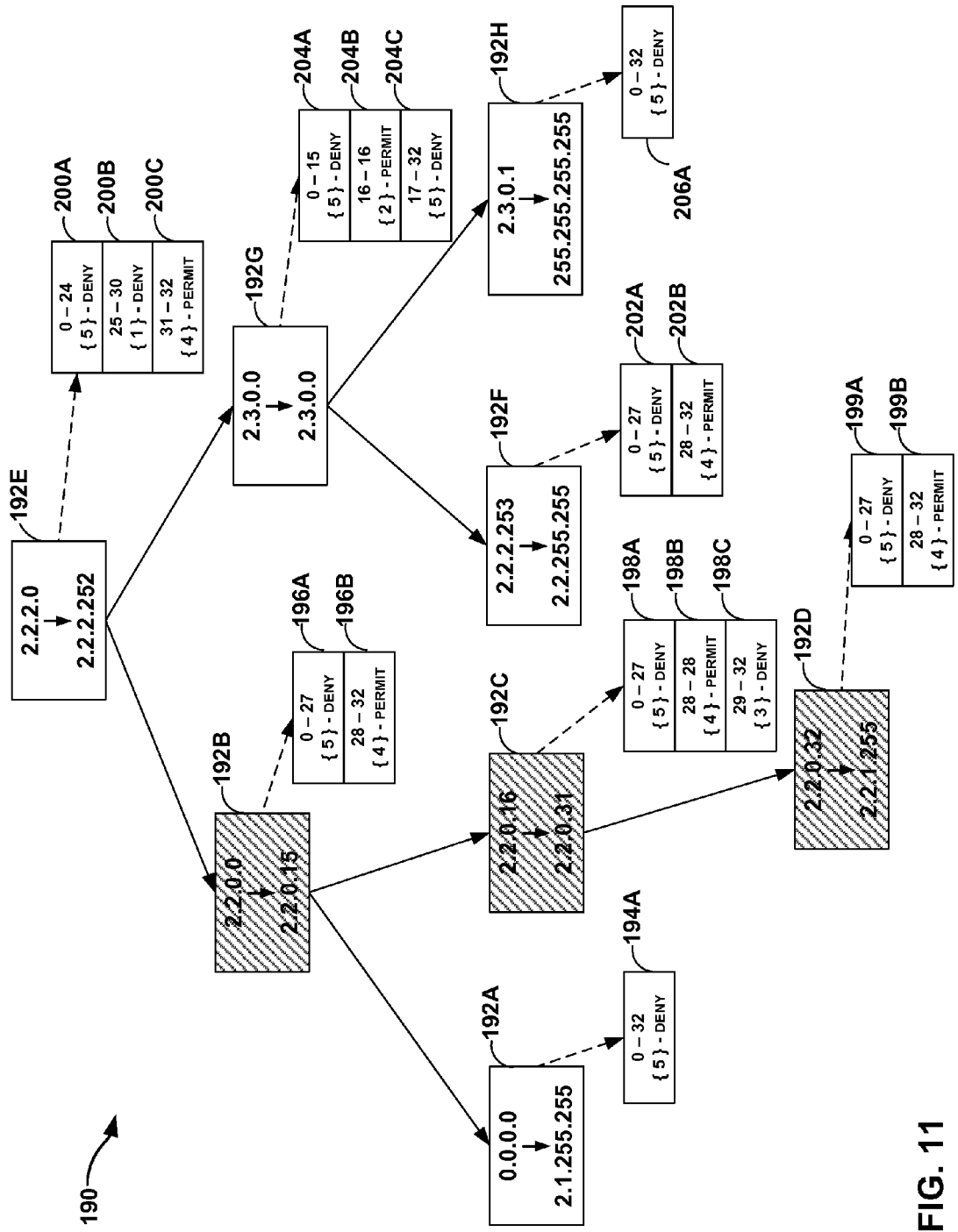
FIG. 11 is a block diagram of an outbound route filter interval tree modified in accordance with the principles of the invention to accommodate the additional route filter entry of FIG. 9.

FIG. 11 is a block diagram illustrating the structure and contents of an interval tree 190 that represents interval tree 130 of FIG. 8 modified due to the additional ORF entry 162E in table 160. Interval tree 190 corresponds to one of ORFs 24 of FIG. 2 and is generated in accordance with the principles of the invention. Upon receiving additional ORF entry 162E, BGP 22A modifies interval tree 130 in accordance with the method illustrated by FIG. 3, described in detail below, in order to arrive at interval tree 190.

ORF entry 162E does not match any of the existing prefix nodes 132 of interval tree 130. Rather, ORF entry 162E has a prefix value that matches addresses that are a subset of the addresses matched by prefix node 132B. BGP 22A effectively splits prefix node 132B into three separate prefix nodes, represented by prefix nodes 192B-192D of interval tree 190 (these nodes are hash-patterned in FIG. 11), to account for the three new intervals, in the prefix address dimension, that result from the inclusion of the prefix value of ORF entry 162E. Specifically, BGP 22A inserts new prefix nodes 192C and 192D. Prefix nodes 192C and 192D include prefix length sub-trees 198 and 199, respectively. Prefix length sub-tree 198 includes length node 198B, which matches routes matched by ORF entry 162E. BGP 22A additionally modifies prefix node 192B to narrow the range of addresses that prefix node 192B encompasses. After the insertion and modification of prefix nodes, interval tree 190 remains height-balanced.

In this manner, interval tree 190 stores and maintains the information contained in received address prefix ORF entries 162 to provide a fast lookup of the filtering action for route advertisements received by router 10.

Various embodiments of the invention have been described. These and other embodiments are within the scope of the following claims.

The invention claimed is:

1. A network device comprising:
a route filter configured to store data defining an interval tree comprising a plurality of first-tier nodes arranged in a tree data structure, wherein each of the first-tier nodes of the interval tree matches a non-overlapping interval of address values along an address dimension, wherein each of the first-tier nodes comprises one or more second-tier nodes, and wherein each of the second-tier nodes specifies a route filter action and matches a non-overlapping interval of length values along a length dimension; and
a control unit configured to:
apply the route filter to a route;
traverse the plurality of first-tier nodes of the interval tree to determine, for an address of the route, a first-tier node that matches an interval of address values that includes the address of the route;
traverse the one or more second-tier nodes of the matching first-tier node to determine, for a length of the route, a second-tier node that matches an interval of length values that includes the length of the route; and
perform a route filter action specified by the matching second-tier node on the route.

2. The network device of claim 1, wherein the interval tree is height-balanced and ordered by the interval of address values matched by the first-tier nodes.

3. The network device of claim 1, wherein the one or more second-tier nodes of a first-tier node comprise a height-balanced tree ordered by the interval of length values matched by the second-tier nodes.

4. The network device of claim 1, wherein each second-tier node of a first-tier node comprises a sequence number that specifies a priority of the node relative to the other second-tier nodes comprised by the first-tier node.

5. The network device of claim 1, wherein each first-tier node comprises a minimum address and a maximum address that define an interval of address values along an address dimension that is matched by the first-tier node.

6. The network device of claim 1, wherein each second-tier node comprises a minimum length and a maximum length that define an interval of length values along a length dimension that is matched by the second-tier node.

7. The network device of claim 1,
wherein the control unit receives a route filter entry comprising route filter configuration data, and
wherein the control unit stores the route filter configuration data in the interval tree of the route filter.

8. The network device of claim 7,
wherein the route filter configuration data comprises an address prefix and an address prefix length, and
wherein, to store the route filter configuration data in the interval tree of the route filter, the control unit is further configured to:
determine an interval of address values defined by the address prefix and the address prefix length;
traverse the first-tier nodes to determine whether a first-tier node matches an interval of address values identical to the interval of address values defined by the address prefix and the address prefix length;
modify one or more second-tier nodes of a first-tier node when the first-tier node matches an interval of address values identical to the interval of address values defined by the address prefix and the address prefix length; and
insert a new first-tier node when the interval of address values defined by the address prefix and the address prefix length is not identical to an interval of address values matched by any of the first-tier nodes.

9. The network device of claim 7,
wherein the route filter configuration data comprises a sequence number, a minimum prefix length, a maximum prefix length, and a route filter action, and
wherein, to store the route filter configuration data in the interval tree of the route filter, the control unit is further configured to modify a second-tier node comprised by one of the plurality of first-tier nodes.

10. The network device of claim 9,
wherein, to modify a second-tier node, the control unit is further configured to modify one or more of 1) a route filter action specified by the second-tier node with the route filter action of the configuration data, and 2) an interval of length values matched by the second-tier node with the minimum prefix length or the maximum prefix length of the configuration data.

11. The network device of claim 9,
wherein each second-tier node of a first-tier node comprises a sequence number that specifies a priority of the node relative to the other second-tier nodes comprised by the first-tier node, and
wherein, to modify a second-tier node, the control unit is further configured to modify a sequence number of the second-tier node with the sequence number of the configuration data.

12. The network device of claim 7,
wherein the route filter configuration data comprises a sequence number, a minimum prefix length, a maximum prefix length, and a route filter action,
wherein, to store the route filter configuration data in the interval tree of the route filter, the control unit is further configured to add a second-tier node to the one or more second-tier nodes comprised by one of the plurality of first-tier nodes,
wherein the second-tier node specifies the route filter action of the route filter configuration data, and
wherein the second-tier node matches an interval of length values defined, in part, by one of the minimum prefix length and the maximum prefix length.

13. A method comprising:
storing route filter data for a route filter in a network device as an interval tree comprising a plurality of first-tier nodes arranged in a tree data structure, wherein each of the first-tier nodes of the interval tree matches a non-overlapping interval of address values along an address dimension, wherein each of the first-tier nodes comprises one or more second-tier nodes, and wherein each of the second-tier nodes specifies a route filter action and matches a non-overlapping interval of length values along a length dimension;
traversing, with the network device, the plurality of first-tier nodes of the interval tree to determine, for an address of a route, a first-tier node that matches an interval of address values that includes the address of the route;
traversing the one or more second-tier nodes of the matching first-tier node to determine, for a length of the route, a second-tier node that matches an interval of length values that includes the length of the route; and
performing a route filter action specified by the matching second-tier node on the route.

14. The method of claim 13, further comprising:
receiving, from a second network device, a route filter entry comprising route filter configuration data; and
storing the route filter configuration data in the interval tree of the route filter.

15. The method of claim 14,
wherein the route filter configuration data comprises an address prefix and an address prefix length, and
wherein storing the route filter configuration data in the interval tree of the route filter comprises:
   determining an interval of address values defined by the address prefix and the address prefix length;
   traversing the first-tier nodes to determine whether a first-tier node matches an interval of address values identical to the interval of address values defined by the address prefix and the address prefix length;
   modifying one or more second-tier nodes of a first-tier node when the first-tier node matches an interval of address values identical to the interval of address values defined by the address prefix and the address prefix length; and
   inserting a new first-tier node when the interval of address values defined by the address prefix and the address prefix length is not identical to an interval of address values matched by any of the first-tier nodes.

16. The method of claim 13,
wherein the route filter configuration data comprises a sequence number, a minimum prefix length, a maximum prefix length, and a route filter action, and
wherein storing the route filter configuration data in the interval tree of the route filter comprises modifying a second-tier node comprised by one of the plurality of first-tier nodes.

17. A non-transitory computer-readable medium comprising instructions for causing a programmable processor to:
   store route filter data for a route filter in a network device as an interval tree comprising a plurality of first-tier nodes arranged in a tree data structure, wherein each of the first-tier nodes of the interval tree matches a non-overlapping interval of address values along an address dimension, wherein each of the first-tier nodes comprises one or more second-tier nodes, and wherein each of the second-tier nodes specifies a route filter action and matches a non-overlapping interval of length values along a length dimension;
   traverse the plurality of first-tier nodes of the interval tree to determine, for an address of a route, a first-tier node that matches an interval of address values that includes the address of the route;
   traverse the one or more second-tier nodes of the matching first-tier node to determine, for a length of the route, a second-tier node that matches an interval of length values that includes the length of the route; and
   perform a route filter action specified by the matching second-tier node on the route.

18. The non-transitory computer-readable medium of claim 17, wherein the instructions cause the processor to:
   receive, from a second network device, a route filter entry comprising an address prefix and an address prefix length;
   determine an interval of address values defined by the address prefix and the address prefix length;
   traverse the first-tier nodes to determine whether a first-tier node matches an interval of address values identical to the interval of address values defined by the address prefix and the address prefix length;
   modify one or more second-tier nodes of a first-tier node when the first-tier node matches an interval of address values identical to the interval of address values defined by the address prefix and the address prefix length; and
   insert a new first-tier node when the interval of address values defined by the address prefix and the address prefix length is not identical to an interval of address values matched by any of the first-tier nodes.

* * * * *